(12) United States Patent
Yankilevich et al.

(10) Patent No.: US 12,074,857 B2
(45) Date of Patent: Aug. 27, 2024

(54) PARTIAL AUTHENTICATION TAG AGGREGATION TO SUPPORT INTERLEAVED ENCRYPTION AND AUTHENTICATION OPERATIONS ON MULTIPLE DATA RECORDS

(71) Applicant: Microsoft Technology Licensing, LLC, Redmond, WA (US)

(72) Inventors: Yevgeny Yankilevich, Haifa (IL); Oren Ish-Am, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 529 days.

(21) Appl. No.: 17/214,439

(22) Filed: Mar. 26, 2021

(65) Prior Publication Data

US 2022/0311756 A1   Sep. 29, 2022

(51) Int. Cl.
*H04L 29/06* (2006.01)
*H04L 9/40* (2022.01)

(52) U.S. Cl.
CPC ........ *H04L 63/062* (2013.01); *H04L 63/0435* (2013.01); *H04L 63/0876* (2013.01)

(58) Field of Classification Search
CPC . H04L 9/0637; H04L 63/0435; H04L 9/3242; H04L 63/0876; H04L 63/062
See application file for complete search history.

(56) References Cited

U.S. PATENT DOCUMENTS

| | | | | |
|---|---|---|---|---|
| 9,148,396 | B2* | 9/2015 | Sennett | H04M 1/72436 |
| 10,509,914 | B1* | 12/2019 | Desai | G06F 21/604 |
| 2004/0044963 | A1* | 3/2004 | Uchiyama | G06F 16/951 |
| | | | | 707/E17.058 |
| 2006/0285684 | A1* | 12/2006 | Rogaway | H04L 9/0637 |
| | | | | 380/37 |

(Continued)

OTHER PUBLICATIONS

"International Search Report and Written Opinion Issued in PCT Application No. PCT/US22/018068", Mailed Date: Jun. 13, 2022, 11 Pages.

(Continued)

*Primary Examiner* — Mohammad A Siddiqi
(74) *Attorney, Agent, or Firm* — Holzer Patel Drennan (57) ABSTRACT

A method supporting interleaved authentication-encryption operations for different data records provides for constructing authentication tag usable to authenticate a transmitted data record from multiple different tag segments generated by an authentication-encryption engine in association with different segments of the data record. The method provides for recovering a first partial tag from a first segment tag received from an authentication-encryption engine by performing one or more operations effective to reverse certain operations performed by the third-party authentication-encryption engine. One or more additional partial tags may be similarly recovered from additional tag segments subsequently output from the third-party authentication-encryption engine in association with the data record, and a complete authentication tag for the data record may be (Continued)

generated based on the recovered first partial tag and each of the one or more additional recovered partial tags.

17 Claims, 7 Drawing Sheets

(56) References Cited

U.S. PATENT DOCUMENTS

| | | | | |
|---|---|---|---|---|
| 2008/0212769 | A1* | 9/2008 | Patel | H04L 9/3236 |
| | | | | 380/28 |
| 2009/0326367 | A1* | 12/2009 | Doyle | G01R 33/5616 |
| | | | | 324/309 |
| 2013/0238900 | A1* | 9/2013 | Leggette | G06F 9/5077 |
| | | | | 713/165 |
| 2016/0048709 | A1* | 2/2016 | Butler | H01Q 9/285 |
| | | | | 340/10.51 |
| 2017/0005999 | A1* | 1/2017 | Choyi | H04L 63/0823 |
| 2017/0026171 | A1* | 1/2017 | Lal | H04L 9/0822 |
| 2019/0043600 | A1 | 2/2019 | Saileshwar et al. | |
| 2019/0213322 | A1* | 7/2019 | Dehon | G06F 9/4401 |
| 2019/0220721 | A1* | 7/2019 | Chhabra | G06K 19/0724 |
| 2020/0076609 | A1* | 3/2020 | Minematsu | H04L 9/3236 |
| 2020/0328879 | A1 | 10/2020 | Makaram et al. | |
| 2021/0367761 | A1* | 11/2021 | Sofia | H04L 9/14 |
| 2021/0374256 | A1* | 12/2021 | Elbaum | G06F 21/602 |
| 2022/0006653 | A1* | 1/2022 | Ghetie | G06F 21/575 |
| 2022/0311598 | A1* | 9/2022 | Yankilevich | H04L 9/0631 |

OTHER PUBLICATIONS

"International Search Report and Written Opinion Issued in PCT Application No. PCT/US22/019211", Mailed Date: Jun. 20, 2022, 12 Pages.

"Non Final Office Action Issued in U.S. Appl. No. 17/238,432", Mailed Date: Sep. 14, 2023, 14 Pages.

U.S. Appl. No. 17/238,432, filed Apr. 23, 2021.

Notice of Allowance mailed on Mar. 13, 2024, in U.S. Appl. No. 17/238,432, 15 pages.

* cited by examiner

PARTIAL AUTHENTICATION TAG AGGREGATION TO SUPPORT INTERLEAVED ENCRYPTION AND AUTHENTICATION OPERATIONS ON MULTIPLE DATA RECORDS

BACKGROUND

Cloud-based resource providers may transmit tenant-owned data between devices at different locations, including cloud storage centers, edge devices, etc. Current best practices provide for encrypting the tenant-owned data during each leg of transit to help prevent interception, corruption, manipulation, or other nefarious actions by third parties. Some existing solutions for encrypting data in transit rely on powerful, fast, "third-party authentication-encryption engines" which may include software, hardware, or a combination of both. One example authentication-encryption engine is an AES with Galois/Counter Mode (AES-GCM) engine that provides both authenticated encryption (confidentiality and authentication) and the ability to compute and check the integrity of additional authenticated data (AAD). While highly reliable and efficient, these third-party authentication-encryption engines generally act as "black boxes" that the cloud resource provider has no ability to alter or manipulate.

Tenant-owned data that is transmitted between different devices implementing these encryption-authentication solutions may be diverse in nature—e.g., of different size files, different data types, different levels of relative priority for data management, etc. In some cases, the tenants owning such data may prefer that the cloud-based resource providers manage the data according to particular latency requirements (e.g., some tenants may enforce more stringent latency requirements than other tenants). Yet, an individual device performing the above-mentioned encryption-authentication activities may have access to a single authentication-encryption engine. When traffic bandwidth is high, data records may occasionally be "queued" up to await encryption. Some current solutions do not provide any efficient mechanism that allow encryption and authentication operations on one stream to be "paused" so that another stream, such as a higher priority stream (or a stream subject to more stringent latency requirements) can be processed.

The above-described inability to pause, temporarily abort, and later resume encryption and authentication activities on one stream (e.g., in order to treat another stream between pausing and resumption) by a third-party authentication-encryption engine arises, in part, due to the nature of "authentication tags" that certain types of third-party encryption-engines also generate when encrypting data. Specifically, the herein disclosed technology pertains to an encryption-authentication scheme known as AES-GCM. In AES-GCM authentication encryption schemes, authentication tags are an important and widely-used mechanism that allows a recipient of a transmitted data record to verify that received data is from a trusted source and also that the data has not been tampered with.

If, for example, encryption activities of a third-party authentication-encryption engine are "paused" and subsequently resumed with respect to a first data record to allow for encrypting a higher-priority second record in the interim, the third-party authentication-encryption engine may output two authentication tags in association with the first data record—one associated with a segment of the data record encrypted prior to the "pause" and another associated with a segment of the data record encrypted following the "pause." Due to the nature and format of these AES-GCM authentication tags, neither of the two tags generated in the above scenario is usable to support authentication of the subsequently-transmitted first data record as a whole.

The above-mentioned shortcoming arises, in part, due to the inability of a cloud-based resource provider to alter the "black box" logic of these third-party authentication-encryption engines. While a cloud-resource provider may choose to utilize alternate (e.g., self-developed) encryption solutions, self-developed encryption code is typically more inefficient and error prone than these long-standing legacy-code solutions. Furthermore, cryptographic modules are sometimes subject to certification requirements (e.g., FIPS-140) which are expensive to achieve and to which the standard solutions usually adhere.

SUMMARY

According to one implementation, an authentication-encryption scheme supporting interleaved operations on different data records is implemented via a third-party authentication-encryption engine (e.g., an AES-GCM engine) and a partial tag recovery and accumulation engine. The third-party encryption engine generates a first segment tag during an encryption process which encrypts a first segment of a data record and one or more additional segment tags during separate, subsequent encryption processes which encrypt other segments of the data record. However, none of the individual segment tags is valid to authenticate the data record as a whole. The partial tag recovery and accumulation engine performs one or more recovery operations on the first segment tag to effectively reverse one or more end-of-segment authentication operations performed by the third-party authentication-encryption engine and thereby recover a first partial tag. The partial tag recovery and accumulation engine also recovers one or more additional partial tags from the additional segment tags subsequently generated by and output in association with the data record. A complete authentication tag is then generated based on the partial tags recovered for all segments of the data record. The complete authentication tag is usable to authenticate aspects of the data record as a whole.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other implementations are also described and recited herein.

DETAILED DESCRIPTION

The herein disclosed technology provides solutions that allow the "black box" logic of certain third-party authentication-encryption engines, such as AES-CGM engines, to be used—without alteration—to support more flexible encryption-authentication schemes that may allow for dynamic re-prioritization of various encryption activities, such as to supported interleaved authentication-encryption operations on multiple different streams, on as-needed basis.

For example, the AES-GCM engine may be used to process different segments of multiple data records in an interleaved fashion such that two or more different data records may be partially processed before any individual record is completely encrypted and a complete authentication tag for it is produced. For example, authentication-encryption activities on a first data record may be selectively "paused," at which time the AES-GCM engine may output a first encrypted segment of the first data record along with a first authentication tag based on that segment. Then, the AES-GCM engine may be instructed to process a different second data record (e.g., a record owned by a different tenant) before the authentication-encryption activities are "resumed" with respect to the first data record. Upon resumption and eventual completion of the encryption operations for the first data record, the AES-GCM engine outputs one or more additional encrypted data segments of the first data record along with one or more additional authentication tags generated based on those segments.

In the above example of "interleaved" authentication-encryption activities on different data records, the third-party authentication encryption engine outputs a first authentication tag generated based on the first segment of the first data record and, subsequently, a second authentication tag generated based on a second segment of the first data record when the second segment subsequently processed. An authentication tag that is generated based on a segment of a data record rather than on a full data record is herein referred to as a "segment tag." For reasons discussed herein, these segments tags are not usable to authenticate the full data record; thus, the segment tags are effectively "invalid" with respect to verification of a transmitted (full) data record.

The herein disclosed solutions provide for tag manipulation mechanisms that facilitate recovery of usable authentication data ("partial tag data") from segment tags generated by a third-party authentication-encryption engine based on different continuous and non-overlapping segments of a same data record. This recovered partial tag data for the different segment tags may then be aggregated and subjected to various mathematical operations effective to construct a complete authentication tag that is usable to verify aspects of the data record as a whole.

The herein disclosed authentication tag generation solutions permit continued reliance on highly-reliable and efficient "Legacy code" type of authentication-encryption engine solutions in previously un-supported encryption schemes that facilitate interleaved authentication operations on different data records before finishing encryption and authentication activities with respect to any individual one of the data records. This benefit is realized without substantial duplication of logic performed by the authentication-encryption engine (e.g., AES-GCM engine), thereby adapting the existing efficient and reliable encryption hardware and software solutions for these previously unsupported use cases.

As used herein, "encryption-authentication operations" refers to operations that are performed as part of an encryption process or operations that are used to generate authentication data for a data record.

Figure 1:
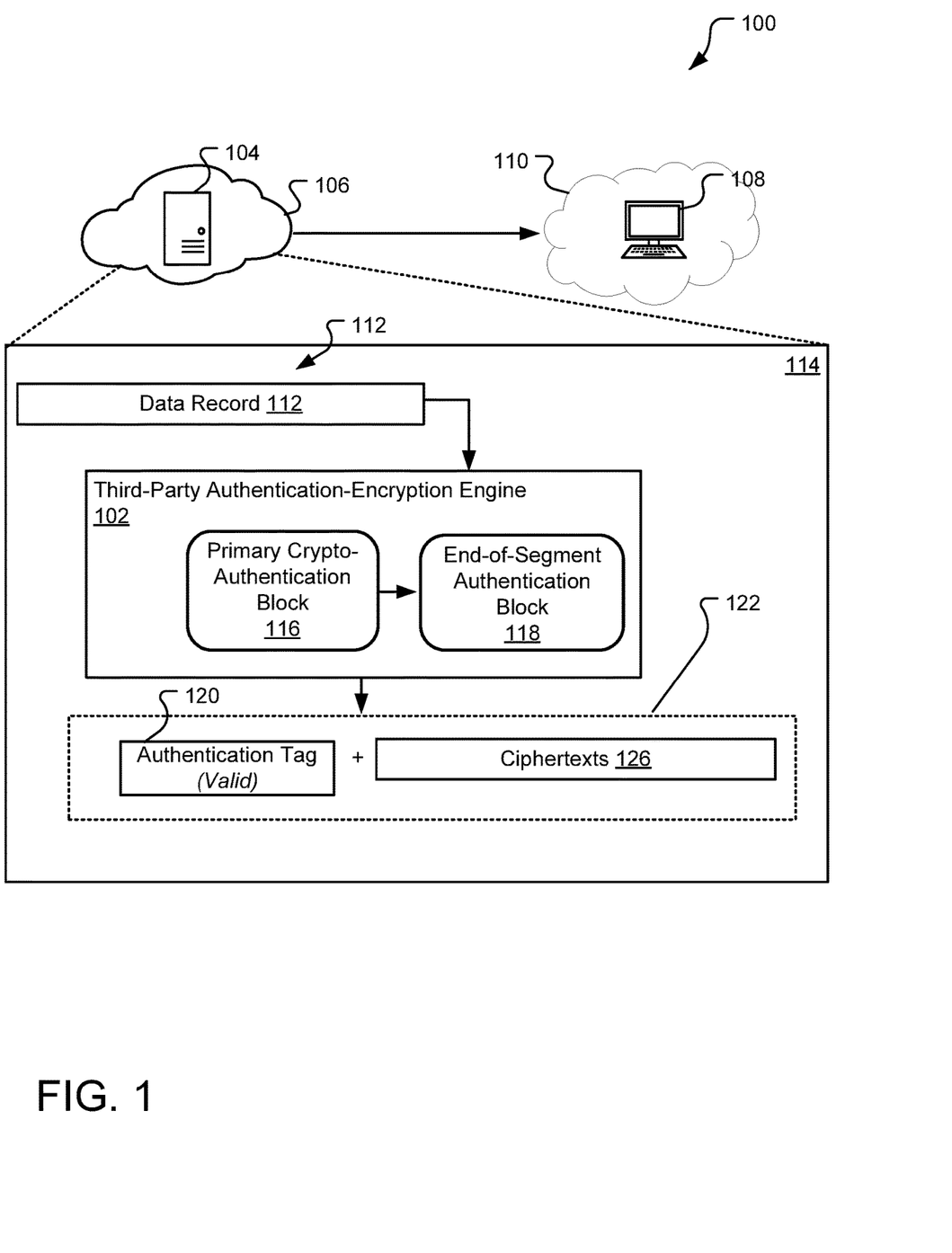
FIG. 1 illustrates aspects of an example data-in-transit authentication-encryption system between two endpoints.

FIG. 1 illustrates aspects of an example system 100 for encrypting data in transit between two endpoints. By example and without limitation, the system 100 is shown to include a first device 104 at a first cloud endpoint 106 that is preparing a data record 112 for transit to a second device 108 located at a second cloud endpoint 110. The first device 104 and the second device 108 may be understood as being any of a variety of different types networked computing devices including, for example, cloud-compute servers, edge devices, gateway devices, etc. By example and without limitation, one or both of the first device 104 and the second device 108 may provide cloud-based processing resources as part of a cloud-computing platform that manages data owned by various tenants that subscribe to the data management services provided by the platform. Each time data is transmitted between different devices within the cloud-computing platform, the data is encrypted and an authentication tag is created prior to transit. Data is decrypted upon receipt and authenticated using the authentication tag.

By example and without limitation, the first device 104 includes a third-party authentication-encryption engine 102. The third-party authentication-encryption engine 102 is "third-party" in the sense that it is manufactured and distributed by a party that is neither the owner of the device 104 nor a manager of the cloud-compute platform including the first device 104 and the second device 108. Rather, the third-party authentication-encryption engine 102 may be understood as including proprietary software, hardware, or a mix thereof. In one implementation, the third-party authentication-encryption engine 102 is a proprietary encryption product (e.g., legacy code) that is purchased as an unalterable (e.g., "black box" type) package by parties that want to provide a highly efficient and secure means of encrypting data for transit. The third-party authentication-encryption engine 102 may, for example, be purchased as a software package, a hardware chip, etc. by an operator/developer of the cloud compute platform.

By example and without limitation, a view 114 illustrates exemplary encryption operations that are performed by the third-party authentication-encryption engine 102. Specifically, the third-party authentication-encryption engine 102 is provided with the data record 112.

The third-party authentication-encryption engine 102 includes a primary crypto-authentication block 116 that performs operations for encrypting segments of the data record 112 and for generating some data, referred to herein as "partial tag data" that is subsequently used to generate an authentication tag 120 for the encrypted data.

In general, the operations of the primary crypto-authentication block 116 can be understood as being "segment-based," where a segment represents a continuous subset of the data record 112 (e.g., either the entire record or a portion of the record). As used herein, the term "segment-based operation" refers to an operation that acts on quantized units of a data record that collectively form a continuously-processed segment of the record, such as to encrypt the continuously-processed segment or to create partial tag data based on the components. The primary crypto-authentication block 116 generates ciphertexts 126 based on an input segment of the data record 112. The ciphertexts 126 may, for example include one or more encrypted data segments of the data record 112. Encryption of these data segments may be performed in various ways, such as based on a secret key or other critical security parameters. In some implementations, the primary crypto-authentication block 116 also uses the ciphertexts 126 it generates to create what is referred to herein as "partial tag data," which is used in a subsequent process (discussed below) for generating the authentication tag 120 for the ciphertexts 126.

Following the segment-based operations performed by the primary crypto-authentication block 116, the third-party authentication-encryption engine 102 provides outputs of the primary crypto-authentication block 116 (e.g., the ciphertexts 126 and partial tag data (not shown)) to an end-of-segment authentication block 118 that performs various end-of-segment authentication operations to generate an authentication tag 120 for the ciphertexts 126. As used herein, the term "end-of-segment authentication operation" is used to refer to an operation performed on an encrypted data segment (e.g., the ciphertexts 126) to generate an authentication tag for the encrypted data segment.

In traditional use cases, the primary crypto-authentication block 116 continuously encrypts the entire data record 112 and the end-of-segment authentication block 118 receives ciphertexts representing the full data record 112. In this case, the authentication tag 120 generated by the end-of-segment authentication block 118 is valid with respect to the data record 112 as a whole and usable to authenticate the ciphertexts 126 and, implicitly, the data record 112. For example, the authentication tag 120 may be used to verify that the data record 112 been transmitted by a trusted source (e.g., a party with knowledge of a secret key used to create the ciphertexts) and/or to verify that the data record has not been tampered with. In one implementation, the authentication tag 120 is generated based on the ciphertexts 126 and is encoded to include authentication information, such as a secret key, length of the encrypted data record 122, etc.

However, in the specific implementations discussed herein with respect to FIG. 2 through 6, the various segments of the data record 112 may be processed non-continuously by the primary crypto-authentication block 116, with segments of other record(s) being processed in between. In these cases, the end-of-segment authentication block 118 may, at times, receive ciphertexts generated based on a segment of the data record 112 (e.g., a unit smaller than the full record) instead of based on the entire data record 112. In these latter cases, the authentication tag 120 generated by the end-of-segment authentication block 118 is invalid with respect to the data record 112 as a whole.

Figure 2:
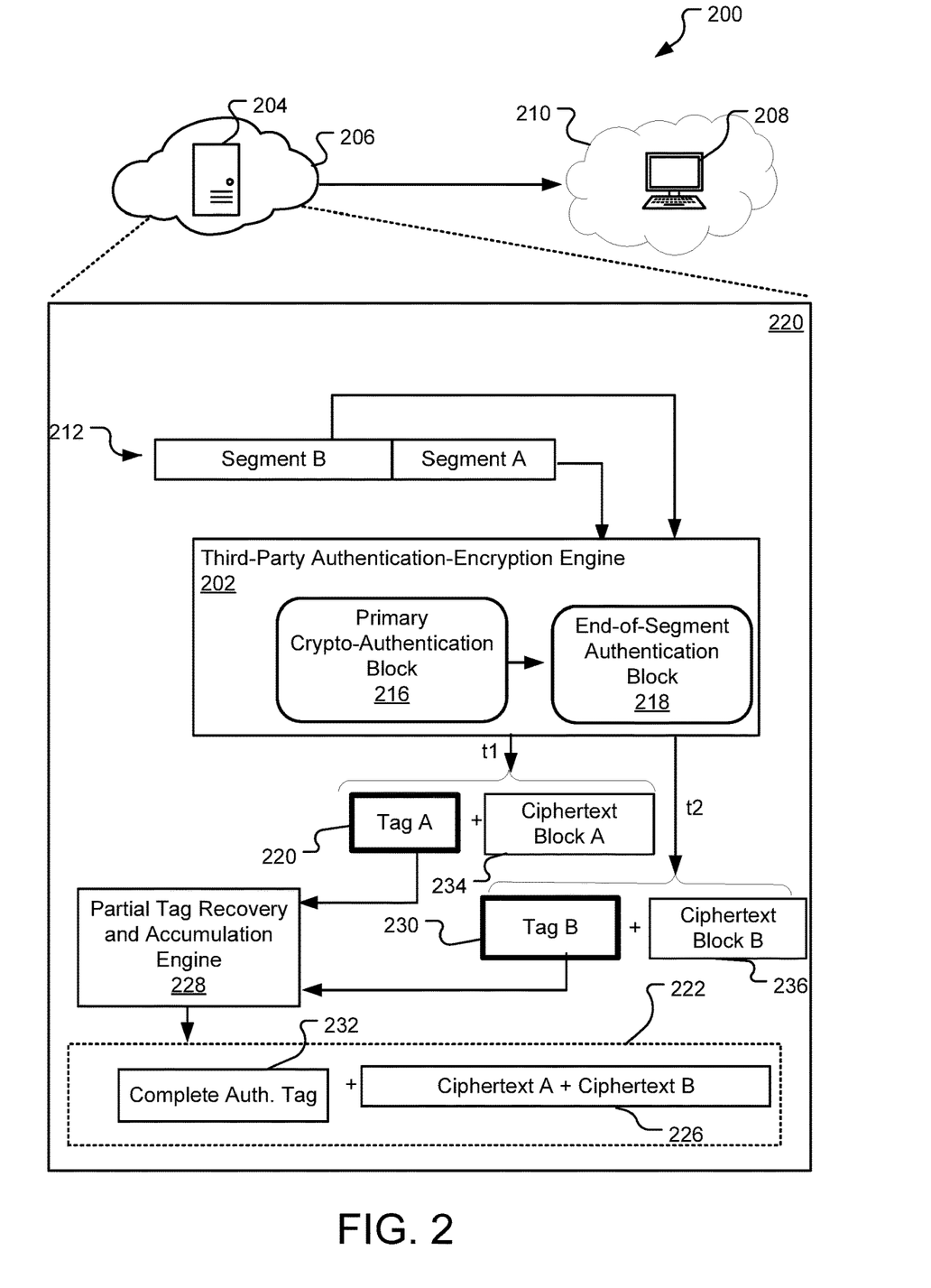
FIG. 2 illustrates another data-in-transit authentication-encryption system via an authentication-encryption scheme that supports interleaved operations on different data records.

The ciphertexts 126 and the authentication tag 120 collectively form an encrypted and authenticated data record 122 that is transmitted from the first device 104 to the second device 108. Upon receipt of the encrypted data record 122, the second device 108 uses the authentication tag 120 to attempt to authenticate the data record 112. For example, a valid authentication tag may be used to ensure that the ciphertext 126 does not include errors (bit flips) or to confirm that the source of the transmission (e.g., the first device 104) had the secret key that was also used to generate the ciphertexts 126. In the same or another implementation, the authentication tag 120 includes size information (e.g., a length value (N)) that is useable by the second device 108 to confirm that a size of the received encrypted data record 122 matches an expected size. In using the authentication tag 120 to verify the integrity of the ciphertexts 126, it is imperative that the authentication tag 120 be generated from the entire data record 112—otherwise, the authentication tag 120 is not usable to authentication the data record 112 as a whole. An authentication tag generated based on a partial record is guaranteed—with high probability—to be different from one computed on the full data record and is therefore invalid as an authentication tag for the entire record. FIG. 2 further explores challenges posed by and an additional component of the system—a partial tag recovery and accumulation engine—that addresses and remedies this shortcoming.

Although not shown in FIG. 1, the second device 108 may utilize a decryption block that performs complementary operations to the primary crypto-authentication block in order to decrypt and verify the integrity of received ciphertexts. In this reverse process, a version of the authentication tag is calculated from the received ciphertexts 126. This calculated version of the authenticated tag is then compared to the authentication tag 120 that is received with (appended to) the ciphertexts 126 in the transmitted data stream. Since the technology disclosed herein is directed to methods for authentication tag generation, it is implied that aspects of authentication tag authentication (e.g., by a receiving device) are consistent with those methods known in the art, particularly in systems utilizing AES-GCM engines.

FIG. 2 illustrates another system 200 for encrypting and authenticating data in transit between two endpoints via an encryption-authentication scheme that supports interleaved encryption-authentication operations on different data records. By example and without limitation, the system 200 is shown to include a first device 204 at a first cloud endpoint 206 that is preparing a data record 212 for transmission to a second device 208 at a second cloud endpoint 210. As shown in expanded view 214, the first device 204 utilizes a third-party authentication-encryption engine 202 to encrypt the data record 212 prior to transmission.

The first device 204, the second device 208, the data record 212, and the third-party authentication-encryption engine 202 may all have characteristics and functionality the same or similar to that described with respect to like-named features of FIG. 1. In addition to the third-party authentication-encryption engine 202, the first device 204 also includes a partial tag recovery and accumulation engine 228 that performs operations effective to adapt outputs of the third-party authentication-encryption engine 202 to support more flexible encryption-authentication schemes, particularly schemes that support interleaved encryption-authentication operations on different data records before finishing encryption activities with respect to any individual one of the data records. The expanded view 214 illustrates exemplary logic of one such interleaved-stream encryption scheme.

In the illustrated example, the third-party authentication-encryption engine 202 is initially provided with a first segment, "segment A," of the data record 212. It can be assumed, for purposes of this example, that processing activities on the data record 212 are paused after segment A is processed and prior to the start of processing of segment B. For example, the first device 204 may pause the encryption-authentication activities on the data record 212 so as to request processing of a more urgent (higher priority) data record (not shown). After processing operations are performed on the other data record, the processing operations on segment B of the data record 212 are resumed.

In one implementation, during the initial processing of segment A of the data record 212, a primary crypto-authentication block 216 uses a secret key (not shown) to encrypt individual units of data within segment A, thereby generating a corresponding ciphertext for each separately-encrypted data unit. These ciphertexts generated based on segment A are represented in FIG. 2 as "ciphertext block A 234." The primary crypto-authentication block 216 may also generate a partial authentication tag data based on ciphertext block A 234.

Following the above operations performed by the primary crypto-authentication block 216, an end-of-segment authentication block 218 performs end-of-segment operations that utilize as inputs both the ciphertext block A 234 and partial authentication tag data to generate an authentication tag ("Tag A"), which is referred to herein as a "segment tag 220" because the tag is generated based on a segment of the entire data record rather than upon the entire data record. Specifically, segment tag 220 is based on segment A—which again, refers to a segment that is continuously processed for encryption without interrupt.

In one implementation, segment tag 220 (Tag A) is generated in two steps. First, the primary crypto-authentication block 216 uses the individual ciphertexts in ciphertext block A 234 to generate what is referred to herein as a "partial tag." Following generation of the partial tag, the end-of-segment authentication block 218 performs various cryptographic function(s) to combine the partial tag with other information, such as a length of ciphertext block A or critical security parameters. Since the segment tag 220 is generated using ciphertext block A 234 but not using ciphertexts corresponding to segment B (ciphertext block B 236), the segment tag (Tag A) is not usable to verify information pertaining to the data record as a whole. For example, Tag A cannot alone be used to verify the integrity of the ciphertexts 226 (ciphertext blocks A and B combined) representing all encrypted data of the data record 212.

The partial tag recovery and accumulation engine 228 receives outputs from the third-party authentication-encryption engine 202 and uses the outputs to construct an authentication tag that is usable by a receiving device to verify the integrity of the encrypted record 222 as a whole. At a first time t1, the partial tag recovery and accumulation engine 228 receives the segment tag 220 that is generated for segment A of the data record 212. At a later time, such as after all or a portion of another data record has been encrypted by the third-party authentication-encryption engine 202, the next segment, segment B, of the data record 212 is processed in a manner the same or similar to that described above with respect to segment A. This process generates additional a new block of ciphertexts, ciphertext block B 236 along with another segment tag 230 (Tag B). Since the segment tag 230 is generated using ciphertext block B 236 but not using the data of ciphertext block A 234, the segment tag 230 is not usable to verify information pertaining to the data record 212 as a whole. At time t2, the segment tag 230 is provided to and stored within the partial tag recovery and accumulation engine 228.

As mentioned above, the partial tag recovery and accumulation engine 228 performs operations to effectively recover certain information from the segment tags 220, 230 that can then be combined to generate a complete authentication tag 232 usable to verify the integrity of the complete encrypted data record 222. Collectively, the ciphertext block 226 and the complete authentication tag 232 form the encrypted data record 222 that is transmitted from the first device 204 to the second device 208. Upon receipt of the encrypted data record 222, the second device 208 uses the complete authentication tag 232 to authenticate the received data.

Figure 3:
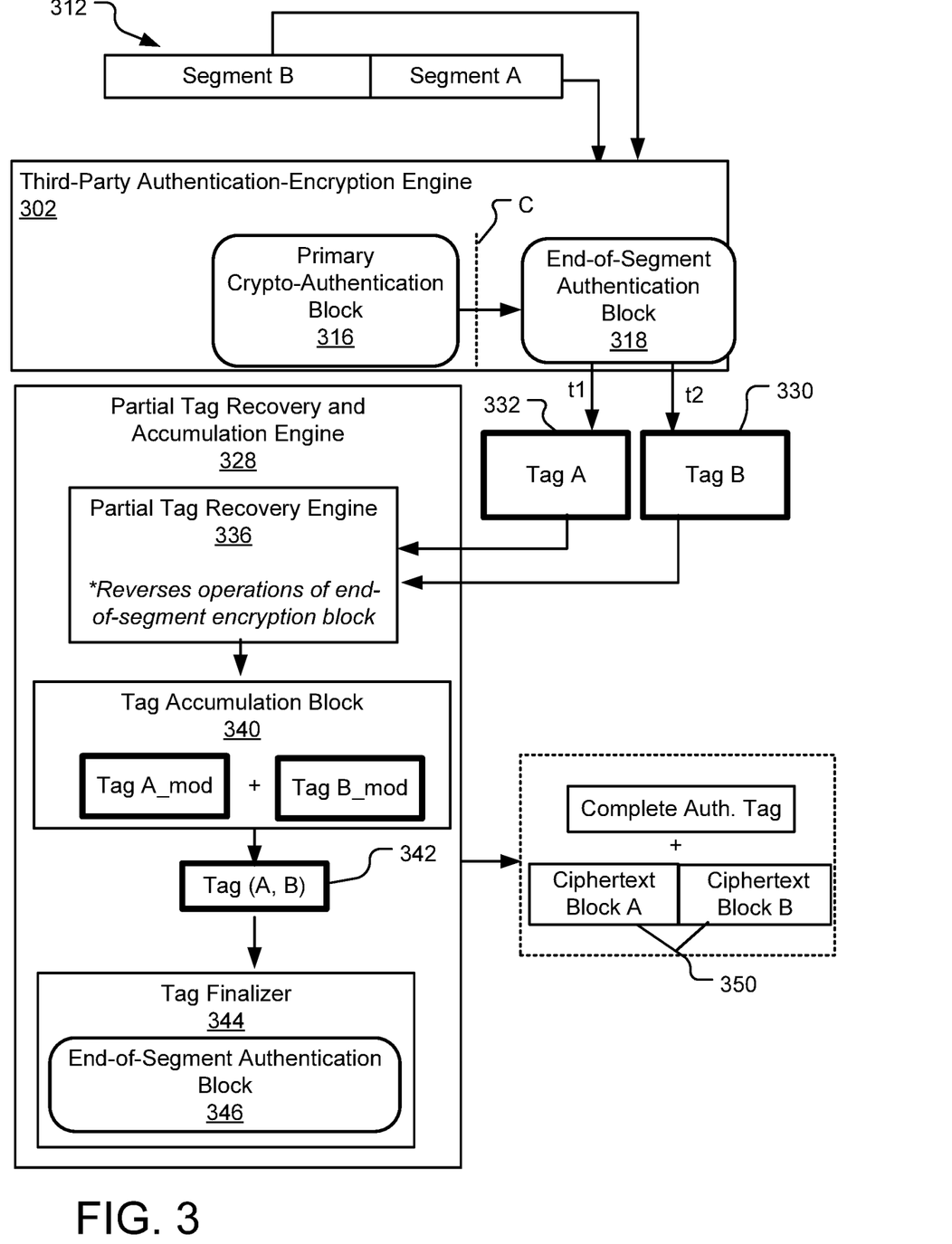
FIG. 3 illustrates further aspects of a data-in-transit authentication-encryption system between two endpoints.

FIG. 3 illustrates further aspects of an example system 300 for encrypting and authenticating data in transit between two endpoints. The system 300 includes many of the same components as those shown in FIG. 2 including a third-party authentication-encryption engine 302 and a partial tag recovery and accumulation engine 328. FIG. 3 differs from FIG. 2 in that further detail is provided with respect to submodules and components of the partial tag recovery and accumulation engine 328. In the illustrated example, the third-party authentication-encryption engine 302 includes a primary crypto-authentication block 316 and an end-of-segment encryption block 318 that each perform the same or similar operations as those described with respect to like-named components in FIGS. 1 and 2.

At a first time, the third-party authentication-encryption engine 302 processes and encrypts a first segment, segment A, of a data record 312 and outputs a block of ciphertexts (not shown) along with a first segment tag 330 (Tag A). At a later time, such as after processing segment(s) of a different data record, the third-party authentication-encryption engine 302 processes another segment, segment B, of the data record 312 and outputs another block of ciphertexts (not shown) along with a second segment tag 332 (Tag B). Since neither of the segment tags 330, 332 is generated based on the entire data record 312, the segment tags are not valid when used to authenticate data record 312 as a whole. Specific exemplary detail of the content included in the segment tags 330, 332 (Tag A, Tag B) is discussed further with respect to FIG. 4 below.

The segment tags 330, 332 (Tag A, Tag B) for the data record 312 are provided to a partial tag recovery engine 336 that is included within the partial tag recovery and accumulation engine 328. The partial tag recovery engine 336 performs operations on each of the segment tags 330, 332 that effectively reverse (undo) operations of the end-of-segment authentication block 318 to recover usable partial tag data with respect to each segment tag. Once usable partial tag data has been recovered with respect to each of the data segments A and B, the associated data is saved in a tag accumulation block 340. The tag accumulation block 340 acts as a register or buffer that stores usable partial tag data and accumulates (combines) such data upon receipt of each additional round of such data. For example, Tag A is first processed by the partial tag recovery engine 336, resulting in the recovery of partial tag data "Tag A_mod", which is stored in a buffer. Subsequently, Tag B is processed by the partial tag recovery engine 336, resulting in the recovery of partial tag data "Tag B_mod," which is placed in the buffer and combined with already-recovered partial tag data for the same data record 312. For example, the usable partial tag data "Tag A_mod" and "Tag B_mod" may be combined by cryptographic functions to yield the partial tag of the segment A∥B (where ∥ is the concatenation function). An example of such a process is discussed below with respect to FIG. 5. Combining the usable partial tag data "Tag A_mod" and "Tag B_Mod" yields a combined partial tag 342 that is output and provided to a tag finalizer 344. The tag finalizer 344 includes an end-of-segment authentication block 346 that may be understood as including the same or similar logic to that performed by the end-of-segment authentication block 318 within the third-party authentication-encryption engine 302.

Stated differently, combined partial tag 342 is identical to information that would be generated and received at a checkpoint "C" between the primary crypto-authentication block 316 and the end-of-segment encryption block 318 in the alternate scenario where the third-party authentication-encryption engine 302 encrypts the entire data record 312 continuously (uninterrupted) rather than in two separate discrete segments (A and B), generating outputs associated with each and/or processing another data record in between the two segments.

The tag finalizer 344 outputs a complete authentication tag 348 that is, in turn, transmitted along with a final ciphertext block 350 for the data record 312 to a receiving device (not shown). The complete authentication tag 348 is usable to verify the integrity of the final ciphertext block 350, such as by allowing the recipient device to (1) authenticate the fact that the transmission is from a trusted party with access to a secret key and/or (2) authenticate the integrity of the data by verifying that the final ciphertext block 350 is error-free (no bit flips or tampering). Further exemplary aspects of this process are discussed in greater detail with respect to the follow figures.

Figure 4:
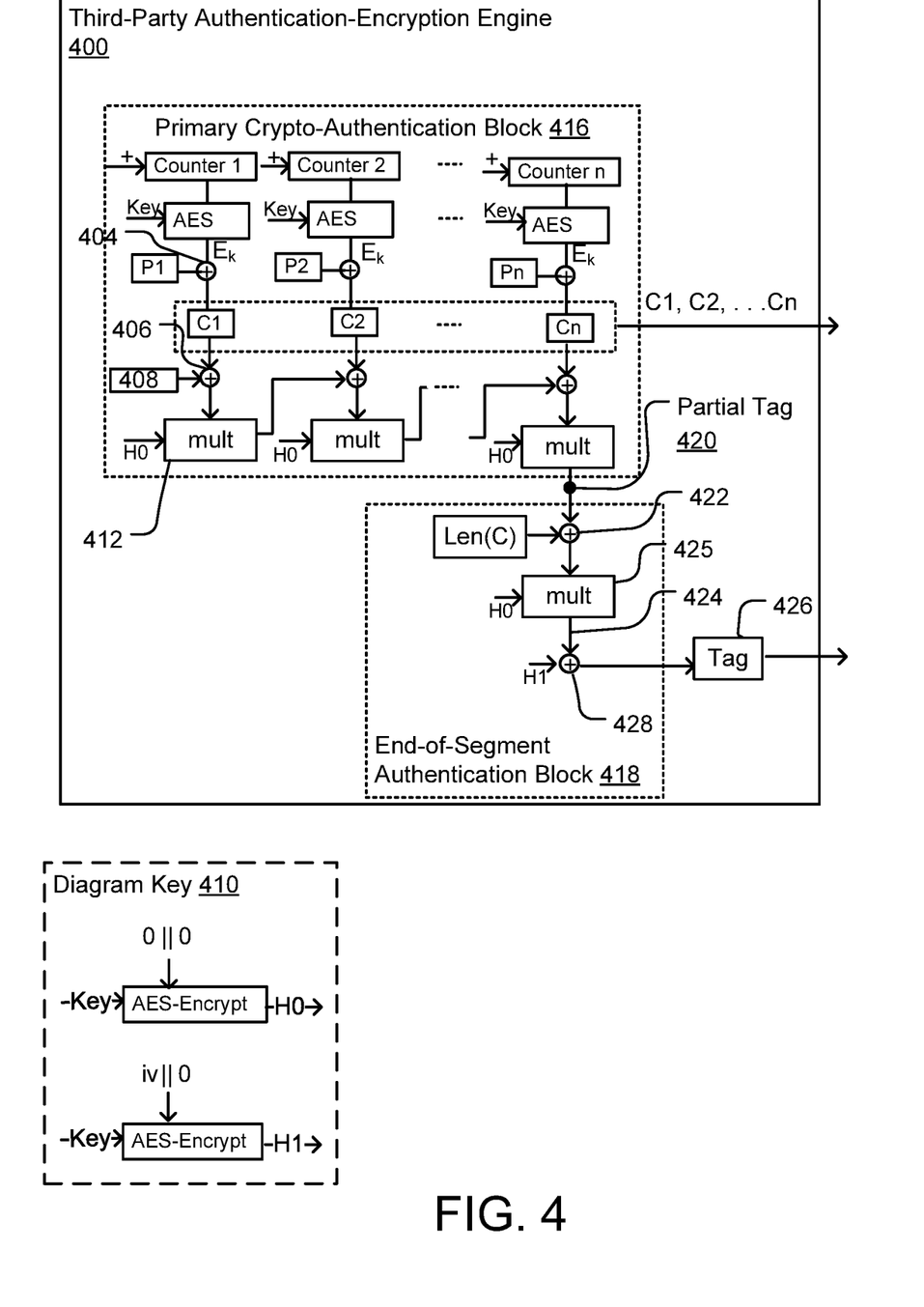
FIG. 4 illustrates exemplary logic of a third-party authentication-encryption engine.

FIG. 4 illustrates exemplary logic of a third-party authentication-encryption engine 400 that provides functionality the same or similar to that described above with respect to any of FIG. 1-3. The third-party authentication-encryption engine 400 includes authentication logic that is, for simplicity of illustration, indicated as being included within one of two logical blocks—a primary crypto-authentication block 416 or an end-of-segment authentication block 418. The primary crypto-authentication block 416 performs segment-based authentication operations to authenticate and combine data that is included within a data record segment and to generate a partial tag 420 based on such data.

The primary crypto-authentication block 416 includes a counter that issues a count (1, 2, etc.) in association with each sequential, like-sized data chunk (e.g., where "data chunk" refers to quantized units of data that collectively form a continuously-processed data segment) of an incoming data record. At each "count," additional encryption operations are performed (shown from top to bottom of each column within the primary crypto-authentication block 416). It should be noted that the illustrated operations are merely exemplary and may vary in different implementations.

Following each increment, the counter is encrypted using a secret key ("key"). This is performed at the block labeled "AES," which stands for "Advanced Encryption Standard"—a exemplary type of symmetric block cipher. The encrypted counter is then combined using function 404 with a corresponding individual data chunk (e.g., P1, P2, . . . Pn) of a data record, yielding a corresponding ciphertext (e.g., C1, C2, . . . Cn). Although different implementations may implement function 404 (and other functions 406, 422, 428) using different logic, this is in one implementation achieved via a bit-wise XOR function.

For example, at count 1, an additive cipher (XOR) is performed to combine the encrypted counter with a first data chunk P1 of an incoming data record yielding the corresponding ciphertext C1. After the ciphertext is generated for an associated data chunk (e.g., P1 at count 1), another function 406 is optionally performed. Function 406 combines previously-generated authentication data with the ciphertext segment for the current count. For example, at count 1 function 406 combines a predefined data segment 408 (e.g., additional authentication data (AAD) associated with the data record) with the ciphertext C1. Not all implementations of the authentication-encryption engine 400 utilize AAD as an input.

The output of function 406 is, at each count, multiplied via a Finite Field multiplier 412 (e.g., GF(2^128) by "H0" which—as shown in diagram key 410—represents information that has been generated based on the key. In the specific example shown, H0 represents a 128-bit value of AES block encryption of "0||0" with a given key. The output of the Finite Field multiplier 412 at the bottom of each column within the primary crypto-authentication block 416 is, at the next count, combined with the next-generated ciphertext (e.g., C2), as shown.

Per the above-described and further illustrated logical operations, the primary crypto-authentication block 416 ultimately outputs the generated ciphertexts C1, C2, C3 and a partial tag 420 that has been generated based on the combination of all ciphertexts generated from the data segment being currently processed.

The end-of-segment authentication block 418 next performs end-of-segment operations on the partial tag 420. Within this block, function 422 combines the length of the generated ciphertexts (e.g., a string including C1, C2, . . . Cn) with the partial tag 420 generated by the primary crypto-authentication block 416. An output of function 422 is then provided to a Finite Field multiplier 425, that multiples this output by H0 (defined as shown in the diagram key 410). An output 424 of the Finite Field multiplier 425 is then combined via function 428 (e.g., another XOR function) with a value—"H1", which represents other encrypted information derived from the key, initialization vector, and/or critical security parameters (as shown in the diagram key 410). The end-of-segment authentication block 418 outputs a tag 426, which is either a complete authentication tag for the entire data record (if the entire data record has been encrypted without interrupt) or a segment tag for the just-processed segment of the data record.

If the tag 426 is a segment tag, this tag is not usable to authenticate or verify the integrity of the data record as a whole. This is because the tag 426 has been generated based on a segment of the data record and not on the entire data record. As shown and described with respect to FIG. 5, below, the partial tag 420 (a usable data portion of the segment tag data) may be recovered by "undoing" (reversing) the three operations performed by the end-of-segment authentication block 418. The partial tag 420 can then be combined with other partial tags generated for the same data record and manipulated to yield a valid, complete authentication tag for the entire data record.

Although example definitions for H0 and H1 are provided in the diagram key 410, these values are examples of readily computable "key-based information"—meaning, data that is derivable based on the secret key using a given (known) encryption mechanism or operation. Other implementations may utilize other types of key-based information for the same or similar purposes.

Figure 5:
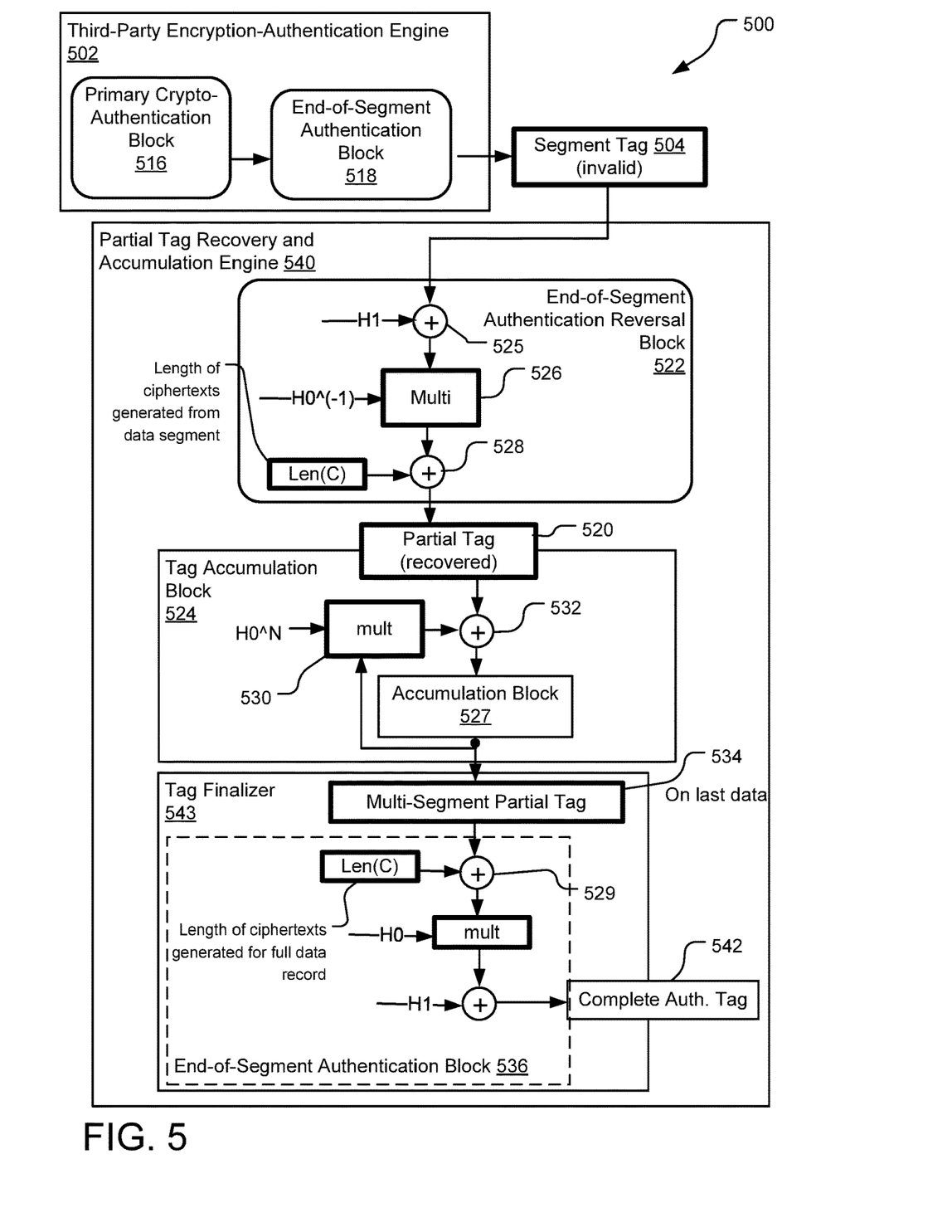
FIG. 5 illustrates aspects of another data-in-transit authentication-encryption system as part of an authentication-encryption scheme that supports interleaved operations on different data records.

FIG. 5 illustrates aspects of another system 500 for encrypting data in transit between two endpoints using an encryption scheme that supports interleaved encryption operations on different data records. The system 500 includes at least a third-party authentication-encryption engine 502 and a partial tag recovery and accumulation engine 540. The third-party authentication-encryption engine 502 performs operations the same or similar to those described elsewhere herein and includes a primary crypto-authentication block 516 and an end-of-segment authentication block 518. In one implementation, the primary crypto-authentication block 516 and the end-of-segment authentication block 518 include components identical to those shown and described in FIG. 4 with respect to primary crypto-authentication block 416 and end-of-segment authentication block 418, respectively.

When the third-party authentication-encryption engine 502 is used to encrypt a segment of a data record rather than the full data record, a segment tag 504 is generated and output. The segment tag 504 is, for example, the same as the tag 426 that is generated and output by the third-party authentication-encryption engine 400 of FIG. 4.

The segment tag 504 is provided to the partial tag recovery and accumulation engine 540. Within the partial tag recovery and accumulation engine 540, the segment tag 504 is provided to an end-of-segment authentication reversal block 522 that functions to reverse (undo) a sequence of encryption operations performed by the end-of-segment authentication block 518 within the third-party authentication-encryption engine 502. In the example shown, it is assumed that the end-of-segment authentication block 518 performs operations identical to those shown and described with respect to the end-of-segment authentication block 418 of FIG. 4. The end-of-segment authentication reversal block 522 effectively reverses these operations to recover a partial tag 520 (e.g., corresponding to partial tag 420 in FIG. 4) for the segment.

By example and without limitation, the end-of-segment authentication reversal block 522 is shown to include a first function 525 (e.g., an XOR function) that combines the segment tag 504 with H1, which is as defined with respect to FIG. 4 (see FIG. 4 diagram key 410). This XOR function serves to "undo" the combinatorial function 428 shown in FIG. 4. The output of function 525 is provided to a Finite Field multiplier 526 that multiplies this data by the 128-bit reciprocal of H0, where H0 is defined as in the diagram key 410 for FIG. 4. This effectively reverses the effect of the Finite Field multiplier 425 shown in FIG. 4. Following the above operations, the output of the Finite Field multiplier 526 is combined, via an XOR function 528, with "Len (C)", which represents the length of the associated ciphertexts (e.g., the length function acting on the encrypted data segment). This effectively reverses the effect of function 422 (also an XOR function) in FIG. 4. The XOR function 528 is the final step in recovering the partial tag 520 for the associated data segment.

The partial tag 520 is provided as an input to a tag accumulator 524, which functions to receive, temporarily store, and ultimately combine multiple such partial tags for different segments of the same data record. If, for example, a first segment of the first data record is processed at a first time and a second segment of the data record is processed at a second time (e.g., with an intervening data record or partial record processed between the two) two segment tags are generated at different times. A partial tag is recovered for each segment via the end-of-segment authentication reversal block 522, and these recovered partial tags are stored and accumulated in the tag accumulator 524.

By example and without limitation, the tag accumulator 524 may implement the following logic: if the partial tag 520 is the first segment tag received for the associated data record, the partial tag is stored directly in an accumulation block 527. If the partial tag 520 is not the first segment tag received for the associated data record, then the partial tag is combined with other partial tag data already stored in the accumulation block 527. In one example implementation, this is achieved by the following:

(1) at a Finite Field multiplier 530, data in the accumulation block 527 is multiplied by the 128-bit value of H0 in the power of N, where N is the number of ciphertexts (individually-encrypted data chunks) generated from the associated data segment.

(2) at function 532 (e.g., XOR function), the output of (1) is combined with the incoming partial tag 520; and (3) the output of function 532 is stored in the accumulation block 527 (i.e., overwriting previously-stored data).

Upon receipt and handling of "last data" (e.g., the last partial tag associated with the data record), the final data stored in the accumulation block 527 is output, represented in FIG. 5 as a "multi-segment partial tag 534" (e.g., a partial tag that is now representative of all segments of the data record).

The output of the tag accumulator 524 is provided to a tag finalizer 543, which includes an end-of-segment authentication block 536. In one implementation, the end-of-segment authentication block 536 performs a sequence of end-of-segment authentication operations similar or identical to those of the end-of-segment authentication block 518. Notably, operation 529 combines the multi-segment partial tag 534 with a length (D), which represents the full length of the combined ciphertexts generated for data record, including all of its segments. Thus, these operations are performed initially on single-segment data within the third-party authentication-encryption engine 502 to generate a segment tag and "undone" (reversed") by the end-of-segment authentication reversal block 522 to recover certain data. The recovered data is combined with like-recovered data for other data segments of the same data record to generate the multi-segment partial tag 534 and, finally, the end-of-segment authentication operations of the end-of-segment authentication block 518 are repeated within the tag finalizer 543 with respect to the now-generated multi-segment partial tag 534. Since the operations of end-of-segment authentication block 536 may be identical to those described with respect to end-of-segment authentication block 418 of FIG. 4, these operations are not repeatedly described with respect to FIG. 5.

The tag finalizer 543 outputs a complete authentication tag 542 that is usable to verify both the authenticity and integrity of the whole streamed data record with respect to critical security parameters.

Figure 6:
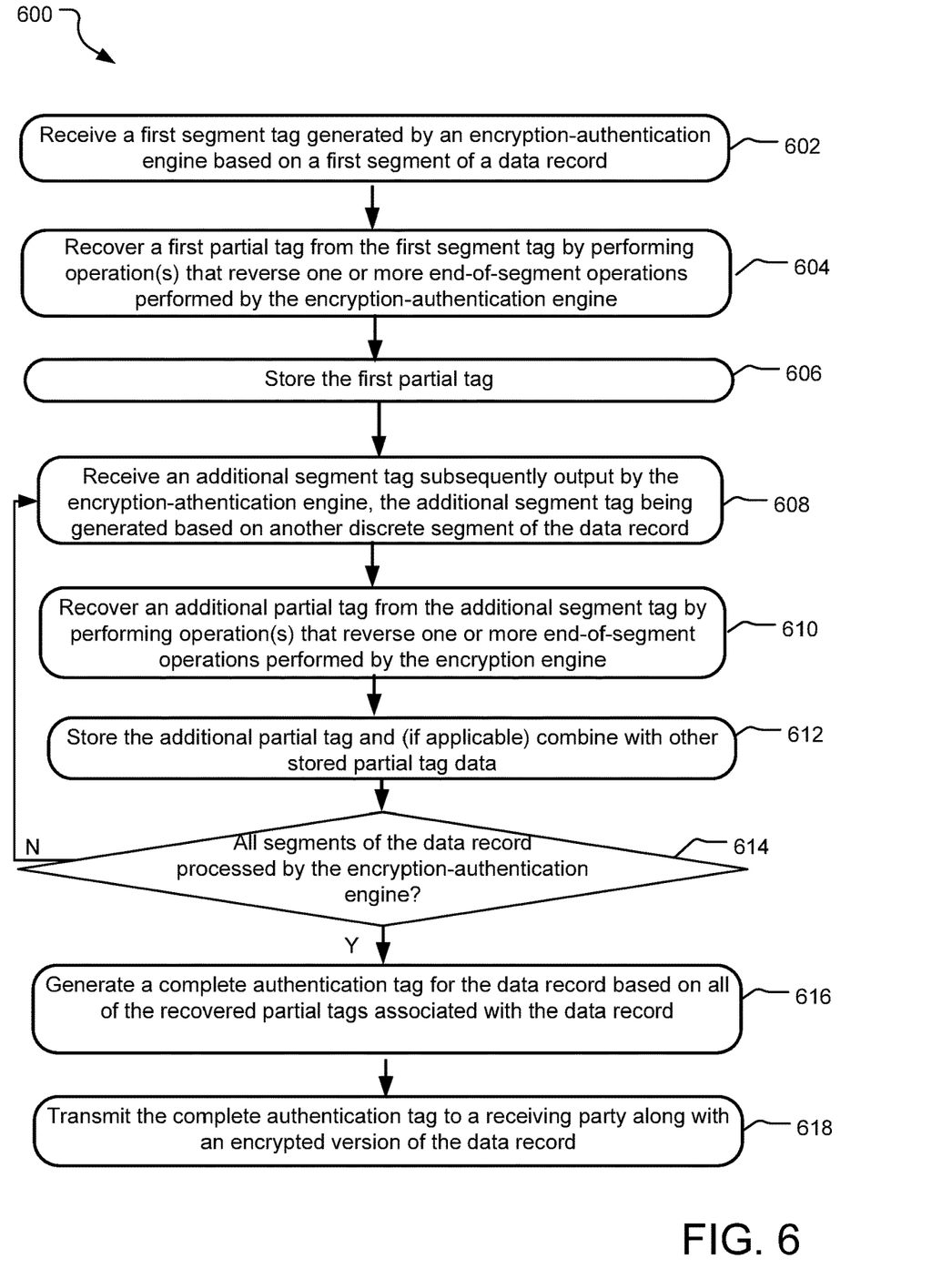
FIG. 6 illustrates example operations for generating an authentication tag for an encrypted data record with multiple discrete segments processed at different times as part of an interleaved authentication-encryption scheme on multiple data records.

FIG. 6 illustrates example operations 600 for generating an authentication tag for an encrypted data record with multiple discrete segments encrypted at different times as part of an interleaved encryption scheme on multiple data records. A receiving operation 602 receives a first segment tag that has been generated by an authentication-encryption engine based on a first segment of a data record. The first segment of the data record is a continuous segment that is shorter than the full length of the data record. A recovery operation 604 recovers a first partial tag from the first segment tag by performing one or more operations collectively effective to reverse one or more end-of-segment operations performed by the authentication-encryption engine. For example, the recovery operation 604 performs operations that reverse those operations performed by the end-of-segment authentication block 518 shown in FIG. 5.

A storage operation 606 stores the first partial tag. Another receiving operation 608 receives an additional segment tag that is subsequently output by the authentication-encryption engine in association with the same data record as the first segment tag. The additional segment tag is a tag that has been generated by the authentication-encryption engine based on a another (e.g., a second) segment of the data record that is distinct from (e.g., non-overlapping with) the first segment. For example, this additional data segment may be encrypted by the authentication-encryption engine following an interim encryption operation on a different data record.

Another recovery operation 610 recovers an additional partial tag from the additional segment tag by performing one or more operations collectively effective to reverse one or more end-of-segment operations performed by the authentication-encryption engine. For example, the recovery operation 610 again performs operations that reverse those operations performed by the end-of-segment authentication block 518 shown in FIG. 5.

Another data storage operation 612 stores the additional partial tag that has been recovered by recovery operation 610. If other partial tags have been previously generated for the same data record and stored by the data storage operation 612, the partial tags are combined (accumulated) together, storing the result.

A determination operation 614 determines whether all segments of the data record have been processed by the authentication-encryption engine. If not, the operations hang and wait for receiving operation 608 to repeat, followed by the recovery operation 610 and storage operation 612.

Once all segments of the data record have been processed by the authentication-encryption engine, an authentication tag generation operation 616 generates a complete authentication tag for the data record based on all recovered partial tags associated with the data record. Exemplary logic for generating the authentication tag from the recovered partial tags, for example, discussed with respect to FIG. 5 (specifically, with respect to operations performed by the tag accumulator 524 and tag finalizer 543).

A transmission operation 618 transmits the complete authentication tag to a receiving party along with an encrypted version of the data record. Upon receipt, the receiving party may utilize the complete authentication tag to authenticate the data record as a whole.

Figure 7:
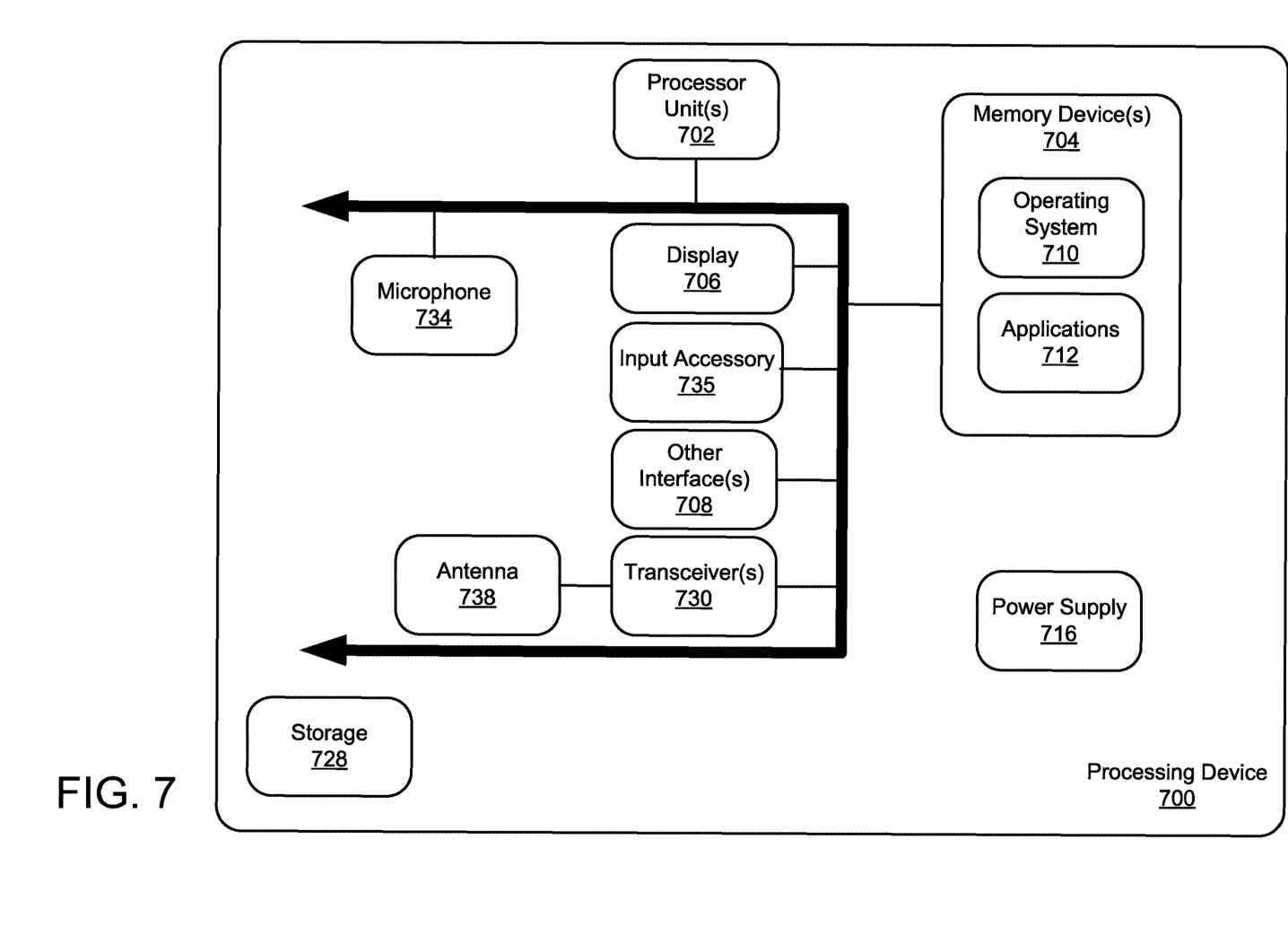
FIG. 7 illustrates an example schematic of a processing device suitable for implementing aspects of the disclosed technology

FIG. 7 illustrates an example schematic of a processing device 700 suitable for implementing aspects of the disclosed technology. The processing device 700 includes one or more processor unit(s) 702, memory 704, a display 706, and other interfaces 708 (e.g., buttons). The memory 704 generally includes both volatile memory (e.g., RAM) and non-volatile memory (e.g., flash memory). An operating system 710, such as the Microsoft Windows® operating system, the Microsoft Windows® Phone operating system or a specific operating system designed for a mixed reality device, resides in the memory 704 and is executed by the processor unit(s) 702, although it should be understood that other operating systems may be employed.

One or more applications 712, such as the third-party authentication-encryption engine 202 of FIG. 2 or the partial tag recovery and accumulation engine 228 of FIG. 2 are loaded in the memory 704 and executed on the operating system 710 by the processor unit(s) 702. Applications 712 may receive input from various input devices such as a microphone 734, input accessory 735 (e.g., keypad, mouse, stylus, touchpad, gamepad, racing wheel, joystick), or inputs from various environmental sensors 736 such as one or more cameras, microphones, etc. The processing device 700 includes projection optics 732 for projecting virtual objects when operating in a virtual or mixed reality mode. The processing device 700 further includes a power supply 716, which is powered by one or more batteries or other power sources and which provides power to other components of the processing device 700. The power supply 716 may also be connected to an external power source (not shown) that overrides or recharges the built-in batteries or other power sources.

The processing device 700 includes one or more communication transceivers 730 and an antenna 738 to provide network connectivity (e.g., a mobile phone network, Wi-Fi®, Bluetooth®). The processing device 700 may also include various other components, such as a positioning system (e.g., a global positioning satellite transceiver), one or more accelerometers, one or more cameras, an audio interface (e.g., the microphone 734, an audio amplifier and speaker and/or audio jack), and storage devices 728. Other configurations may also be employed.

The processing device 700 may include a variety of tangible computer-readable storage media and intangible computer-readable communication signals. Tangible computer-readable storage can be embodied by any available media that can be accessed by the processing device 700 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 700. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

An example method disclosed herein provides for receiving, from a third-party authentication-encryption engine, a first segment tag generated based on a first segment of a data record; recovering a first partial tag by performing one or more recovery operations on the received first segment tag to effectively reverse one or more end-of-segment authentication operations performed by the third-party authentication-encryption engine; recovering one or more additional partial tags from information subsequently output from the third-party authentication-encryption engine, each of the one or more additional partial tags being generated by the third-party authentication-encryption engine based on an additional segment of the data record; generating a complete authentication tag for the data record based on the recovered first partial tag and each of the one or more additional recovered partial tags; and transmitting the complete authentication tag to a receiving party along with an encrypted version of the data record. The complete authentication tag is usable by the receiving party to authenticate the data record.

In another example method according to any preceding method, generating the complete authentication tag for the data record further comprises receiving, from the third-party authentication-encryption engine, a second segment tag generated based on a second segment of the data record; recovering a second partial tag by performing one or more recovery operations on the second segment tag to effectively reverse one or more end-of-segment authentication operations performed by the third-party authentication-encryption engine; and combining at least the first partial tag and the second partial tag.

In yet still another example method of any preceding method, the method generating the complete authentication tag for the data record further comprises combining a size of the data record with an output that is generated, at least partially, as a result of combining the first partial tag and the second partial tag, the complete authentication tag being usable to verify that a size of the encrypted version of the data record remains unchanged between transmission and receipt.

In still another example method of any preceding method, generating the complete authentication tag for the data record further comprises combining key-based information with an output that is generated, at least partially, as a result of combining the first partial tag and the second partial tag. The complete authentication tag is usable to verify that a source of the data record had access to the key-based information. The key-based information is also used by the third-party authentication-encryption engine to encrypt individual packets of the data record.

In yet still another example method of any preceding method, generating the complete authentication tag for the data record further comprises receiving, from the third-party authentication-encryption engine, one or more additional segment tags generated based on other segments of the data record; recovering an additional partial tag in association with each of the one or more additional segment tags received, the recovery of each one of the additional partial tags including one or more recovery operations to effectively reverse one or more end-of-segment authentication operations performed by the third-party authentication-encryption engine; and generating a combined partial tag by accumulating, in memory, the first partial tag and each of the recovered additional partial tags.

In still another example method of any preceding method, generating the complete authentication tag for the data record further comprises performing one or more end-of-segment authentication operations to combine additional data with the combined partial tag.

In still another example method of any preceding method, the additional data includes at least one of a size of the encrypted version of the data record and a key used by the third-party authentication-encryption engine to encrypt individual packets of the data record.

An example disclosed herein includes memory, a processor, and a partial tag recovery and accumulation engine that stored in the memory and executable by the processor to receive, from a third-party authentication-encryption engine, a first segment tag generated based on a first segment of a data record; recover a first partial tag by performing one or more recovery operations on the first segment tag to effectively reverse one or more end-of-segment authentication operations performed by the third-party authentication-encryption engine; and recover one or more additional partial tags from information subsequently output from the third-party authentication-encryption engine. Each of the one or more additional partial tags that is generated by the third-party authentication-encryption engine is based on an additional segment of the data record. The partial tag recovery and accumulation engine is further configured to generate a complete authentication tag for the data record based on the recovered first partial tag and each of the one or more additional recovered partial tags; and transmit the complete authentication tag to a receiving party along with an encrypted version of the data record, the complete authentication tag being usable by the receiving party to authenticate the data record.

In yet another example system of any preceding system, the partial tag recovery and accumulation engine is further executable to receive, from the third-party authentication-encryption engine, a second segment tag generated based on a second segment of the data record; recover a second partial tag by performing one or more recovery operations on the second segment tag to effectively reverse one or more end-of-segment authentication operations performed by the third-party authentication-encryption engine; and combine together at least the first partial tag and the second partial tag.

In another example system of any preceding system, the partial tag recovery and accumulation engine is further executable to generate the complete authentication tag by combining a size of the data record with an output that is generated, at least partially, as a result of combining the first partial tag and the second partial tag, the complete authentication tag being usable to verify that a size of the encrypted version of the data record remains unchanged between transmission and receipt.

In yet another example system of any preceding system, the partial tag recovery and accumulation engine is further executable to implement one or more functions to combine key-based information with an output that is generated, at least partially, as a result of combining the first partial tag and the second partial tag. The complete authentication tag is usable to verify that a source of the data record had access to the key-based information, and the key-based information is also used by the third-party authentication-encryption engine to encrypt individual packets of the data record.

In another example system of any preceding system, the partial tag recovery and accumulation engine is further executable to receive, from the third-party authentication-encryption engine, one or more additional tags generated based on other subsets segments of the data record, and recover an additional partial tag in association with each of the one or more additional tags received. The recovery of each one of the additional partial tags includes one or more recovery operations to effectively reverse one or more end-of-segment authentication operations performed by the third-party authentication-encryption engine. The partial tag recovery and accumulation engine is further executable to generate a combined partial tag by accumulating, in memory, the first partial tag and each of the recovered additional partial tags.

In still another example system of any preceding system, the partial tag recovery and accumulation engine is further executable to perform one or more end-of-segment authentication operations to combine additional data with the combined partial tag.

In yet another example system of any preceding system, the additional data includes at least one of a size of the encrypted version of the data record and a key used by the third-party authentication-encryption engine to encrypt individual packets of the data record.

An example computer-readable storage media disclosed herein encodes a computer process comprising: receiving, from a third-party authentication-encryption engine, a first segment tag generated based on a first segment of a data record; recovering a first partial tag by performing one or more recovery operations on the first segment tag to effectively reverse one or more end-of-segment authentication operations performed by the third-party authentication-encryption engine; and recovering one or more additional partial tags from information subsequently output from the third-party authentication-encryption engine. Each of the one or more additional partial tags that is generated by the third-party authentication-encryption engine is based on an additional segment of the data record. The computer process further comprises generating a complete authentication tag for the data record based on the recovered first partial tag and each of the one or more additional recovered partial tags; and transmitting the complete authentication tag to a receiving party along with an encrypted version of the data record, the complete authentication tag being usable by the receiving party to authenticate the data record.

In another example computer-readable storage media according to any preceding computer-readable storage media, the encoded computer process generates the complete authentication tag by receiving, from the third-party authentication-encryption engine, a second segment tag generated based on a second segment of the data record; recovering a second partial tag by performing one or more recovery operations on the second segment tag to effectively reverse one or more end-of-segment authentication operations performed by the third-party authentication-encryption engine; and combining at least the first partial tag and the second partial tag.

In still yet another computer-readable storage media according to any preceding computer-readable storage media, the encoded computer process generates the complete authentication tag for the data record by combining a size of the data record with an output that is generated, at least partially, as a result of combining the first partial tag and the second partial tag, the complete authentication tag being usable to verify that a size of the encrypted version of the data record remains unchanged between transmission and receipt.

In still yet another computer-readable storage media according to any preceding computer-readable storage media, the encoded computer process generates the complete authentication tag for the data record by combining key-based information with an output that is generated, at least partially, as a result of combining the first partial tag and the second partial tag, the complete authentication tag being usable to verify that a source of the data record had access to the key-based information. The key-based information is also used by the third-party authentication-encryption engine to encrypt individual packets of the data record.

In still yet another computer-readable storage media according to any preceding computer-readable storage media, the encoded computer process generates the complete authentication tag for the data record further by: receiving, from the third-party authentication-encryption engine, one or more additional tags generated based on other subsets segments of the data record; recovering an additional partial tag in association with each of the one or more additional tags received, the recovery of each one of the additional partial tags including one or more recovery operations to effectively reverse one or more end-of-segment authentication operations performed by the third-party authentication-encryption engine; and generating a combined partial tag by accumulating, in memory, the first partial tag and each of the recovered additional partial tags.

In still yet another computer-readable storage media according to any preceding computer-readable storage media, the encoded computer process generates the complete authentication tag by performing one or more end-of-segment authentication operations to combine additional data with the combined partial tag.

An example system disclosed herein includes a means for receiving, from a third-party authentication-encryption engine, a first segment tag generated based on a first segment of a data record, and a means for recovering a first partial tag by performing one or more recovery operations on the received first segment tag to effectively reverse one or more end-of-segment authentication operations performed by the third-party authentication-encryption engine. The system further includes a means for recovering one or more additional partial tags from information subsequently output from the third-party authentication-encryption engine, where each of the one or more additional partial tags that is generated by the third-party authentication-encryption engine is based on an additional segment of the data record. The system further includes a means for generating a complete authentication tag for the data record based on the recovered first partial tag and each of the one or more additional recovered partial tags, and a means for transmitting the complete authentication tag to a receiving party along with an encrypted version of the data record, the complete authentication tag being usable by the receiving party to authenticate the data record.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendix, provide a complete description of the structure and use of exemplary implementations.

What is claimed is:

1. A method comprising:
receiving, from a third-party authentication-encryption engine, a first segment tag generated based on a first segment of a data record and a second segment tag based on a second segment of the data record;
recovering a first partial tag by performing one or more recovery operations on the received first segment tag to effectively reverse one or more end-of-segment authentication operations performed by the third-party authentication-encryption engine;
recovering a second partial tag by performing one or more recovery operations on the second segment tag to effectively reverse one or more end-of-segment authentication operations performed by the third-party authentication-encryption engine;
generating a combined partial tag by combining the first partial tag and the second partial tag;
generating a complete authentication tag for the data record based on the combined partial tag; and transmitting the complete authentication tag to a receiving party along with an encrypted version of the data record, the complete authentication tag being usable by the receiving party to authenticate the data record.

2. The method of claim 1, wherein generating the complete authentication tag for the data record further comprises:
combining a size of the data record with an output that is generated, at least partially, as a result of combining the first partial tag and the second partial tag, the complete authentication tag being usable to verify that a size of the encrypted version of the data record remains unchanged between transmission and receipt.

3. The method of claim 1, wherein generating the complete authentication tag for the data record further comprises:
combining key-based information with an output that is generated, at least partially, as a result of combining the first partial tag and the second partial tag, the complete authentication tag being usable to verify that a source of the data record had access to the key-based information, wherein the key-based information is also used by the third-party authentication-encryption engine to encrypt individual packets of the data record.

4. The method of claim 1, wherein generating the complete authentication tag for the data record further comprises:
receiving, from the third-party authentication-encryption engine, one or more additional segment tags generated based on other segments of the data record;
recovering an additional partial tag in association with each of the one or more additional segment tags received, the recovery of each one of the additional partial tags including one or more recovery operations to effectively reverse one or more end-of-segment authentication operations performed by the third-party authentication-encryption engine; and
generating a combined partial tag by accumulating, in memory, the first partial tag and each of the recovered additional partial tags.

5. The method of claim 4, wherein generating the complete authentication tag for the data record further comprises:
performing one or more end-of-segment authentication operations to combine additional data with the combined partial tag.

6. The method of claim 5, wherein the additional data includes at least one of a size of the encrypted version of the data record and a key used by the third-party authentication-encryption engine to encrypt individual packets of the data record.

7. A system comprising:
memory;
a processor;
a partial tag recovery and accumulation engine stored in the memory and executable by the processor to:
receive, from a third-party authentication-encryption engine, a first segment tag generated based on a first segment of a data record and a second segment tag based on a second segment of the data record;
recover a first partial tag by performing one or more recovery operations on the first segment tag to effectively reverse one or more end-of-segment authentication operations performed by the third-party authentication-encryption engine;
recover a second partial tag by performing one or more recovery operations on the second segment tag to effectively reverse the one or more end-of-segment authentication operations performed by the third-party authentication-encryption engine;
generate a combined partial tag by combining the first partial tag and the second partial tag;
generate a complete authentication tag for the data record based on the combined partial tag; and
transmit the complete authentication tag to a receiving party along with an encrypted version of the data record, the complete authentication tag being usable by the receiving party to authenticate the data record.

8. The system of claim 7, wherein the partial tag recovery and accumulation engine is further executable to generate the complete authentication tag by combining a size of the data record with an output that is generated, at least partially, as a result of combining the first partial tag and the second partial tag, the complete authentication tag being usable to verify that a size of the encrypted version of the data record remains unchanged between transmission and receipt.

9. The system of claim 8, wherein the partial tag recovery and accumulation engine is further executable to:
implementing one or more functions to combine key-based information with an output that is generated, at least partially, as a result of combining the first partial tag and the second partial tag, the complete authentication tag being usable to verify that a source of the data record had access to the key-based information, wherein the key-based information is also used by the third-party authentication-encryption engine to encrypt individual packets of the data record.

10. The system of claim 7, wherein the partial tag recovery and accumulation engine is further executable to:
receive, from the third-party authentication-encryption engine, one or more additional tags generated based on other subsets segments of the data record;
recover an additional partial tag in association with each of the one or more additional tags received, the recovery of each one of the additional partial tags including one or more recovery operations to effectively reverse one or more end-of-segment authentication operations performed by the third-party authentication-encryption engine; and
generate a combined partial tag by accumulating, in memory, the first partial tag and each of the recovered additional partial tags.

11. The system of claim 10, wherein the partial tag recovery and accumulation engine is further executable to:
perform one or more end-of-segment authentication operations to combine additional data with the combined partial tag.

12. The system of claim 11, wherein the additional data includes at least one of a size of the encrypted version of the data record and a key used by the third-party authentication-encryption engine to encrypt individual packets of the data record.

13. One or more tangible computer-readable storage media comprising computer-executable instructions for executing a computer process, the computer process comprising:
receiving, from a third-party authentication-encryption engine, a first segment tag generated based on a first segment of a data record and a second segment tag based on a second segment of the data record;
recovering a first partial tag by performing one or more recovery operations on the first segment tag to effectively reverse one or more end-of-segment authentication operations performed by the third-party authentication-encryption engine;

recovering a second partial tag by performing one or more recovery operations on the second segment tag to effectively reverse one or more end-of-segment operations performed by the third-party authentication-encryption engine;

generating a combined partial tag by combining the first partial tag and the second partial tag;

generating a complete authentication tag for the data record based on the combined partial tag; and transmitting the complete authentication tag to a receiving party along with an encrypted version of the data record, the complete authentication tag being usable by the receiving party to authenticate the data record.

14. The one or more tangible computer-readable storage media of claim 13, wherein generating the complete authentication tag for the data record further comprises:

combining a size of the data record with an output that is generated, at least partially, as a result of combining the first partial tag and the second partial tag, the complete authentication tag being usable to verify that a size of the encrypted version of the data record remains unchanged between transmission and receipt.

15. The one or more tangible computer-readable storage media of claim 13, wherein generating the complete authentication tag for the data record further comprises:

combining key-based information with an output that is generated, at least partially, as a result of combining the first partial tag and the second partial tag, the complete authentication tag being usable to verify that a source of the data record had access to the key-based information, wherein the key-based information is also used by the third-party authentication-encryption engine to encrypt individual packets of the data record.

16. The one or more tangible computer-readable storage media of claim 13, wherein generating the complete authentication tag for the data record further comprises:

receiving, from the third-party authentication-encryption engine, one or more additional tags generated based on other subsets segments of the data record;

recovering an additional partial tag in association with each of the one or more additional tags received, the recovery of each one of the additional partial tags including one or more recovery operations to effectively reverse one or more end-of-segment authentication operations performed by the third-party authentication-encryption engine; and generating a combined partial tag by accumulating, in memory, the first partial tag and each of the recovered additional partial tags.

17. The one or more tangible computer-readable storage media of claim 16, wherein generating the complete authentication tag for the data record further comprises:

performing one or more end-of-segment authentication operations to combine additional data with the combined partial tag.

* * * * *